United States Patent
Santo

(10) Patent No.: US 8,935,991 B2
(45) Date of Patent: Jan. 20, 2015

(54) SMALL ANIMAL INCUBATOR WITH A REMOVABLE DRAWER

(76) Inventor: Mark Patrick Santo, Fulton, MO (US)

( * ) Notice: Subject to any disclaimer, the term of this patent is extended or adjusted under 35 U.S.C. 154(b) by 850 days.

(21) Appl. No.: 12/004,604

(22) Filed: Dec. 22, 2007

(65) Prior Publication Data

US 2009/0159011 A1    Jun. 25, 2009

(51) Int. Cl.
  A01K 1/03    (2006.01)
  A01K 41/00   (2006.01)
  A61D 7/04    (2006.01)

(52) U.S. Cl.
  CPC . *A01K 41/00* (2013.01); *A01K 1/03* (2013.01); *A61D 7/04* (2013.01)
  USPC .......................................... 119/319; 119/420

(58) Field of Classification Search
  CPC ........ A61D 7/04; A01K 41/065; A01K 41/00
  USPC ............ 600/22; 119/309, 311, 318, 319, 320, 119/417, 452, 455, 500, 420
  See application file for complete search history.

(56) References Cited

U.S. PATENT DOCUMENTS

| | | | | |
|---|---|---|---|---|
| 651,246 | A * | 6/1900 | Havens | 119/320 |
| 2,252,191 | A | 8/1941 | Marks | |
| 2,627,841 | A | 2/1953 | Johnson | |
| 3,470,866 | A * | 10/1969 | Gittelson | 600/22 |
| 5,000,120 | A * | 3/1991 | Coiro et al. | 119/419 |
| 5,140,947 | A | 8/1992 | Bruce | |
| 5,657,720 | A * | 8/1997 | Walters | 119/317 |
| 5,759,149 | A * | 6/1998 | Goldberg et al. | 600/22 |
| 5,823,143 | A | 10/1998 | Wilson | |
| 5,887,436 | A * | 3/1999 | Duddleston | 62/3.62 |
| 6,138,610 | A * | 10/2000 | Niki | 119/418 |
| 6,425,347 | B1 | 7/2002 | Bogner et al. | |
| 6,457,437 | B1 * | 10/2002 | Frasier et al. | 119/419 |
| 6,810,833 | B2 * | 11/2004 | Bonner et al. | 119/455 |
| 7,255,671 | B2 * | 8/2007 | Boone et al. | 600/22 |
| 7,438,021 | B2 * | 10/2008 | Dietrich | 119/420 |
| 7,913,651 | B1 * | 3/2011 | Schiebout | 119/496 |
| 2004/0236174 | A1 * | 11/2004 | Boone et al. | 600/21 |

OTHER PUBLICATIONS http://www.brinsea.co.uk/uk/products/tlc4m.html Intensive Care Units, TLC—4M Intensive Care Chamber Curved, smooth interior completely free from fans, sensors etc., for ease of cleaning, Apr. 24, 2003.
http://www.paragonmed.com/incubators.shtml Pro-Care 27 Oxygen Supply-Maximum 50 PSIG with Preheat, Mar. 3, 2006.
http://www.wildlifeinternational.org/EN/rehab/care/caging/incubators.cfm Caging and housing, incubators, Nov. 21, 2008.

* cited by examiner

*Primary Examiner* — Brian M O'Hara
(74) *Attorney, Agent, or Firm* — Russ Weinzimmer & Associates, P.C.

(57) ABSTRACT

A small animal veterinary incubator is disclosed with an animal holding drawer that can be inserted into a temperature controlled enclosure and removed when not in use for cleaning and disinfecting. In various embodiments the incubator is portable, is at least partly transparent, controls interior oxygen and/or humidity, can use a hose to bring oxygen into close proximity with incubated animals, can introduce water-nebulized air or oxygen into the drawer through a hole, and can include a holder for a humidity bottle that humidifies air or oxygen supplied to the incubator. Some embodiments use an adjustable or regulated lamp to warm the incubator using an infrared bulb of 50 or 75 Watts. Temperature, humidity, and/or oxygen gages or sensors can be included, and the temperature, oxygen, and/or humidity can be automatically regulated. Preferred embodiments include closable vents that can be opened to allow for ventilation when only temperature is controlled.

19 Claims, 5 Drawing Sheets

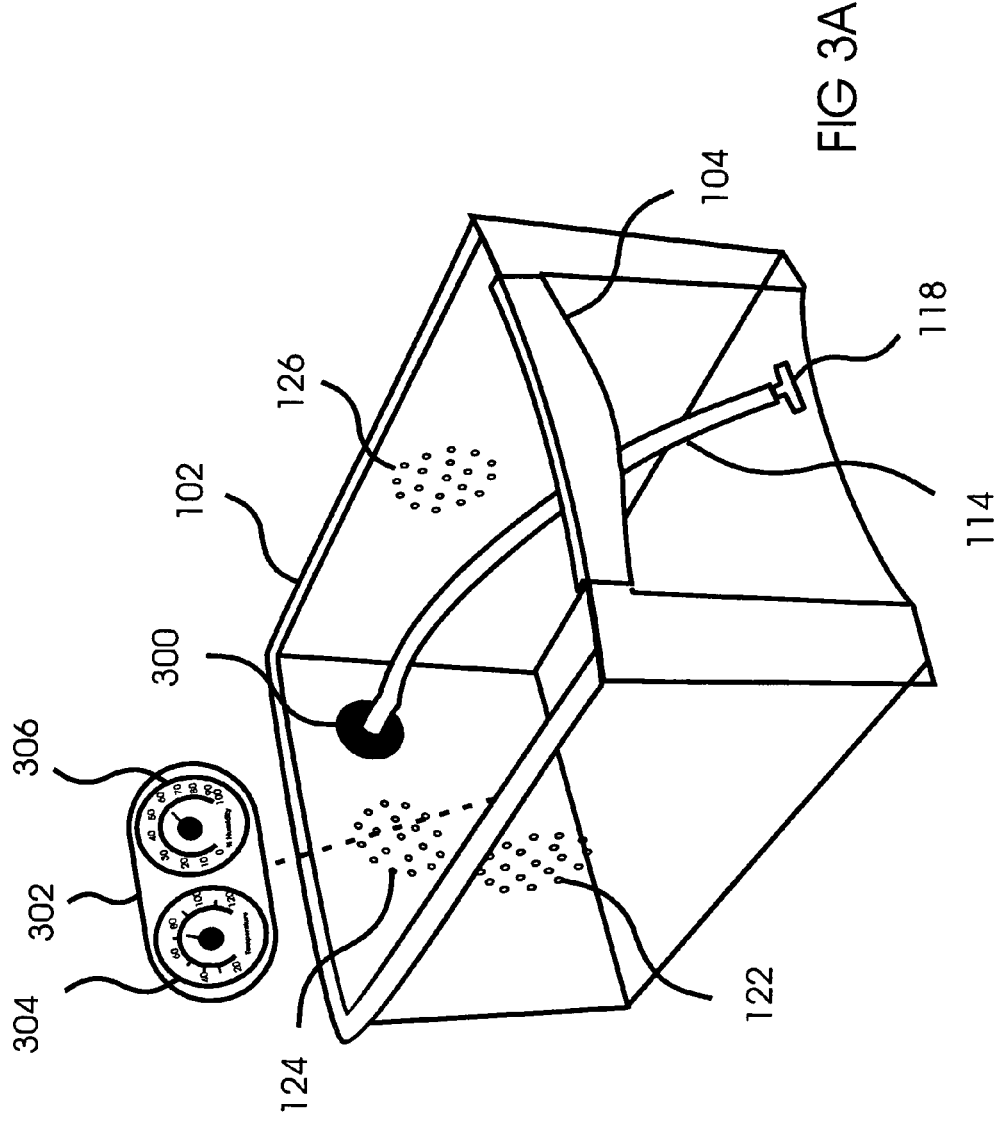

SMALL ANIMAL INCUBATOR WITH A REMOVABLE DRAWER

FIELD OF THE INVENTION

The invention generally relates to equipment used by veterinarians, commercial breeders, and home breeders, and more specifically to incubators for small animals.

BACKGROUND OF THE INVENTION

Incubators are used in veterinary medicine in much the same way as in human medicine. They carefully maintain a desired temperature, and sometimes also a desired oxygen saturation and/or humidity level, in the immediate environment surrounding a newborn animal or a sick animal until the animal is able to mature or recover sufficiently to survive in a less controlled environment.

Animals in need of an incubator frequently also require an environment that is reasonably clean and sterile. This can be more difficult to achieve for veterinary incubators than it is for human incubators because of the prevalence of hair, fur, feathers and such like that is shed by many animals, and also because many animals do not lend themselves readily to the effective use of diapers. Hence, veterinary incubators require frequent cleaning of the interior, and for veterinary incubators that are currently know in the art this can be time consuming and difficult due to small interior sizes and consequently difficult access, as well as the presence of shelves, fittings, sensors, and other features located inside of the incubator that may trap contaminants and may be damaged by some cleaning chemicals and methods.

Another problem faced by veterinarians is a relatively greater sensitivity to cost as compared with human medicine. Veterinarians must make as much use as possible of every item of medical equipment. Many veterinary incubators are too large and/or too heavy to be easily moved from one clinic to another or even from one room to another, and so offer only limited usage flexibility.

SUMMARY OF THE INVENTION

A veterinary incubator for small animals is disclosed that includes an enclosure with a temperature controlled interior and a drawer that can hold a small animal and can be inserted into the enclosure so as to maintain the animal at a desired temperature. In preferred embodiments, the incubator can be easily cleaned and disinfected simply be removing the drawer, cleaning and disinfecting it, and reinserting it into the enclosure.

In further preferred embodiments, the incubator is small enough and light enough to be easily carried from room to room, or transported between offices and clinics. Preferred embodiments also provide a desired level of oxygen saturation within the interior and/or humidify the air or oxygen surrounding animals inside of the incubator. In some of these embodiments, the oxygen can be supplied through a hose that brings the oxygen into close proximity with animals in the drawer while the drawer is inserted into the enclosure. The hose enters the drawer through a hole in the back or in a side of the drawer that allows the drawer to be removed from the enclosure without interrupting the oxygen flow. In some of these embodiments the hose is attachable to and removable from a fitting that is aligned with the hole, so that when the hose is removed oxygen can flow directly into the drawer through the hole. In some of these embodiments air or oxygen together with nebulized water can be introduced through the hole without the hose getting in the way. In still other of these embodiments, the hose is terminated by a T-shaped outlet that inhibits the hose from accidentally falling out of the hole when the drawer is opened, and that causes oxygen to flow into the drawer in two opposing directions, thereby providing better distribution of oxygen inside of the drawer.

In preferred embodiments a lamp is used to supply heat to the interior of the enclosure, and in some of these embodiments the lamp includes an infrared bulb. In some of these embodiments the intensity of the lamp can be adjusted or regulated so as to control the interior temperature of the enclosure. In some preferred embodiments the drawer capacity is between 0.5 and 1.2 cubic feet, and the lamp wattage rating is between 50 and 75 Watts, with the higher wattage ratings being used with the larger drawer sizes.

Preferred embodiments include a temperature measuring device and/or a humidity measuring device that can measure the interior temperature and/or the interior humidity of the enclosure. In some preferred embodiments at least one of the temperature, oxygen saturation, and/or humidity inside of the enclosure is measured by a sensor and automatically controlled and maintained by a feedback regulator.

In further preferred embodiments, the drawer is configured so as to contain any unsanitary contaminants introduced by small animals, thereby limiting or preventing contamination of the enclosure. This allows the incubator to be cleaned and disinfected simply by removing the drawer from the enclosure, cleaning the drawer, disinfecting the drawer, and reinserting the drawer into the enclosure.

In preferred embodiments, the incubator includes at least one air vent in a wall of the enclosure that allows ambient air to pass into and out of the interior of the drawer. In some of these embodiments, there is a corresponding vent in a wall of the drawer. In some of these embodiments air vents in enclosure walls can be closed and opened, and in some of these embodiments the vents are positioned so as to provide cross ventilation between the ambient air and the interior of the drawer.

Some preferred embodiments also include a holder that can hold a humidity bottle, the humidity bottle being able to accept a flow of oxygen and supply moist oxygen to the interior of the drawer. In other preferred embodiments, some or all of the enclosure and/or the drawer is transparent, so that a small animal contained in the drawer inside of the enclosure can be observed from outside of the enclosure.

BRIEF DESCRIPTION OF THE DRAWINGS

FIG. 3A is a perspective drawing that illustrates the configuration of the drawer and the oxygen hose of the preferred embodiment of FIG. 1 and FIG. 2 when the drawer is inserted into the enclosure, but with the enclosure not shown in the drawing so as to more clearly illustrate the configuration of the drawer;

DETAILED DESCRIPTION OF PREFERRED EMBODIMENTS

Figure 1:
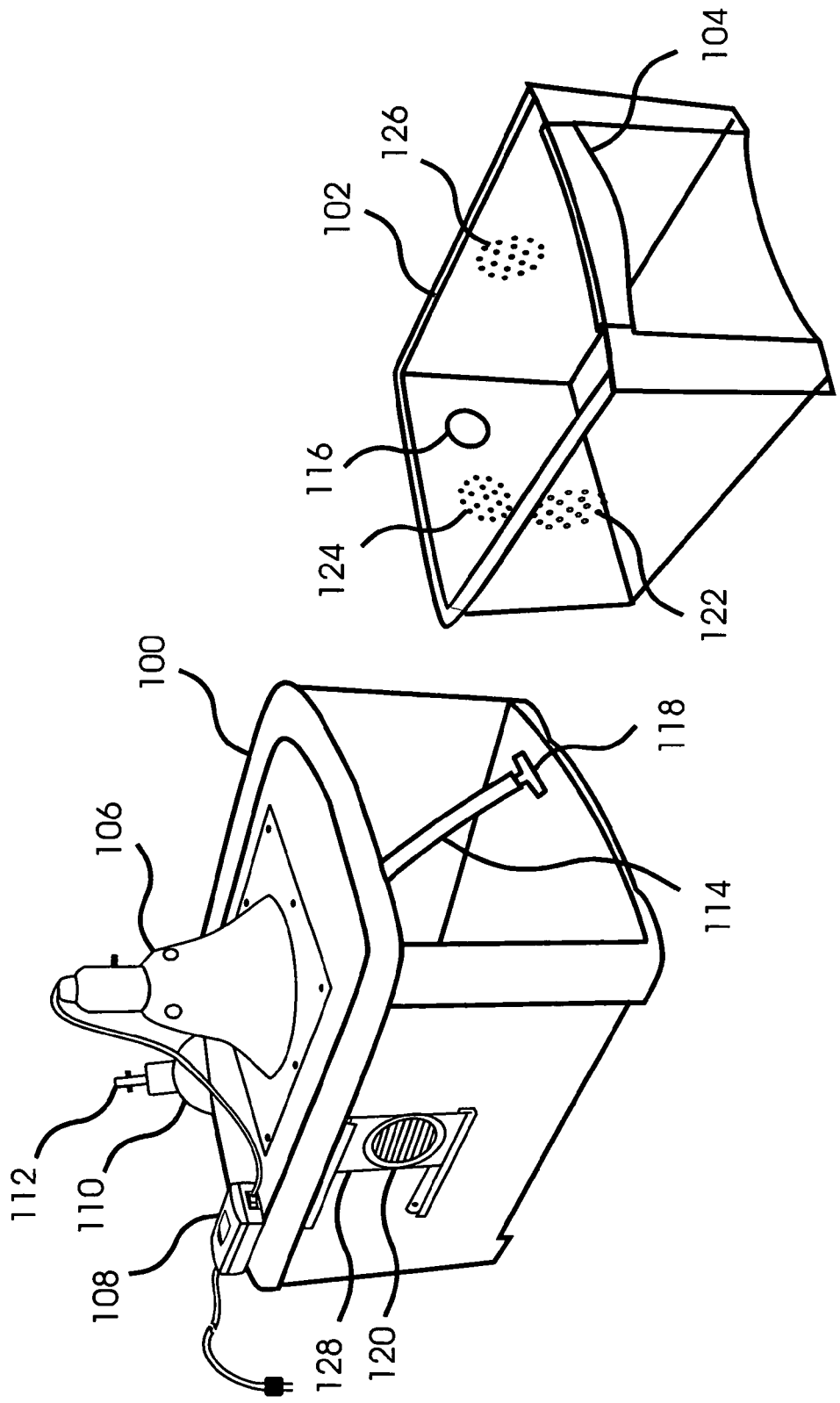
FIG. 1 is a perspective drawing that illustrates a preferred embodiment of the present invention with the drawer removed from the enclosure.

With reference to FIG. 1, the incubator of the present invention includes an enclosure 100, and a drawer 102 that can be inserted into and removed from the enclosure 100. In the embodiment of FIG. 1, the drawer 102 has a handle 104 on the front that is easily grasped for drawer insertion and removal. The enclosure 100 is able to maintain a desired interior temperature, and thereby maintain a desired temperature inside of the drawer 102 when the drawer 102 is inserted into the enclosure 100. In the preferred embodiment of FIG. 1, this is accomplished by using a heating lamp 106 to warm the interior of the enclosure 100. In other preferred embodiments, electrically heated coils and/or other heating apparatus are used. In some embodiments designed for use in very warm climates, an air conditioner or other cooling apparatus is included.

In this embodiment, the drawer 102 is made of transparent plastic, thereby enabling animals inside of the drawer 102 to be viewed from the outside. The enclosure 100 in the embodiment of FIG. 1 is made of opaque plastic, chosen due to its enhanced durability. In other embodiments, the enclosure 100 is also made from transparent plastic, so as to provide enhanced visibility of animals inside of the drawer 102.

In the embodiment of FIG. 1, a manual controller 108 is used to precisely control the amount of heat emitted by the heating lamp 106. In circumstances where the ambient temperature is constant, this is a cost effective solution that can provide a stable interior temperature for long periods of time. In other embodiments, a heat lamp regulator controlled by a temperature sensor is used to maintain a desired temperature inside of the enclosure 100.

The embodiment illustrated in FIG. 1 also includes a humidity bottle 110 that is able to accept a flow of either air or oxygen through a fixture 112 at the top of the humidity bottle 110. The humidity bottle 110 is able to add moisture to the air or oxygen, thereby supplying moist air or moist oxygen to a small animal contained in the interior of the drawer 102 when the drawer 102 is inserted into the enclosure 100. The moist air or oxygen can be supplied to the small animal through a hose 114 that extends into the drawer 102 through a hole 116 in the back of the drawer 102 and brings the moist air or moist oxygen into close proximity with an animal contained in the drawer 102. In the preferred embodiment of FIG. 1, the hose terminates in a T-shaped fitting 118 that inhibits the hose 114 from accidentally falling out through the hole 116 when the drawer 102 is pulled partially out of the enclosure 100. The T-shaped fitting 118 also causes air or oxygen to be introduced into the drawer 102 in two opposing directions, thereby providing enhanced distribution of air or oxygen throughout the drawer 102.

In the preferred embodiment of FIG. 1, vents 120, 122, 124, 126 are provided in the walls of the enclosure 100 and the sides of the drawer 102. Although not visible in the figure, a vent is also provided in this embodiment in the right side wall of the enclosure 100 that corresponds to the right side wall vent 126 in the drawer 102. This provides for cross ventilation across the interior of the drawer 102. The vents 120, 122, 124, 126 in the enclosure walls and in the drawer walls are aligned so as to provide for exchange of ambient air with the interior of the drawer 102 when the incubator is being used only to maintain a small animal at a desired temperature. Covers 128 are provided in this embodiment that can close the vents when the oxygen saturation and humidity of the interior of the drawer 102 are also being controlled. In FIG. 1, the cover 128 is transparent and is shown in the closed position.

Figure 2:
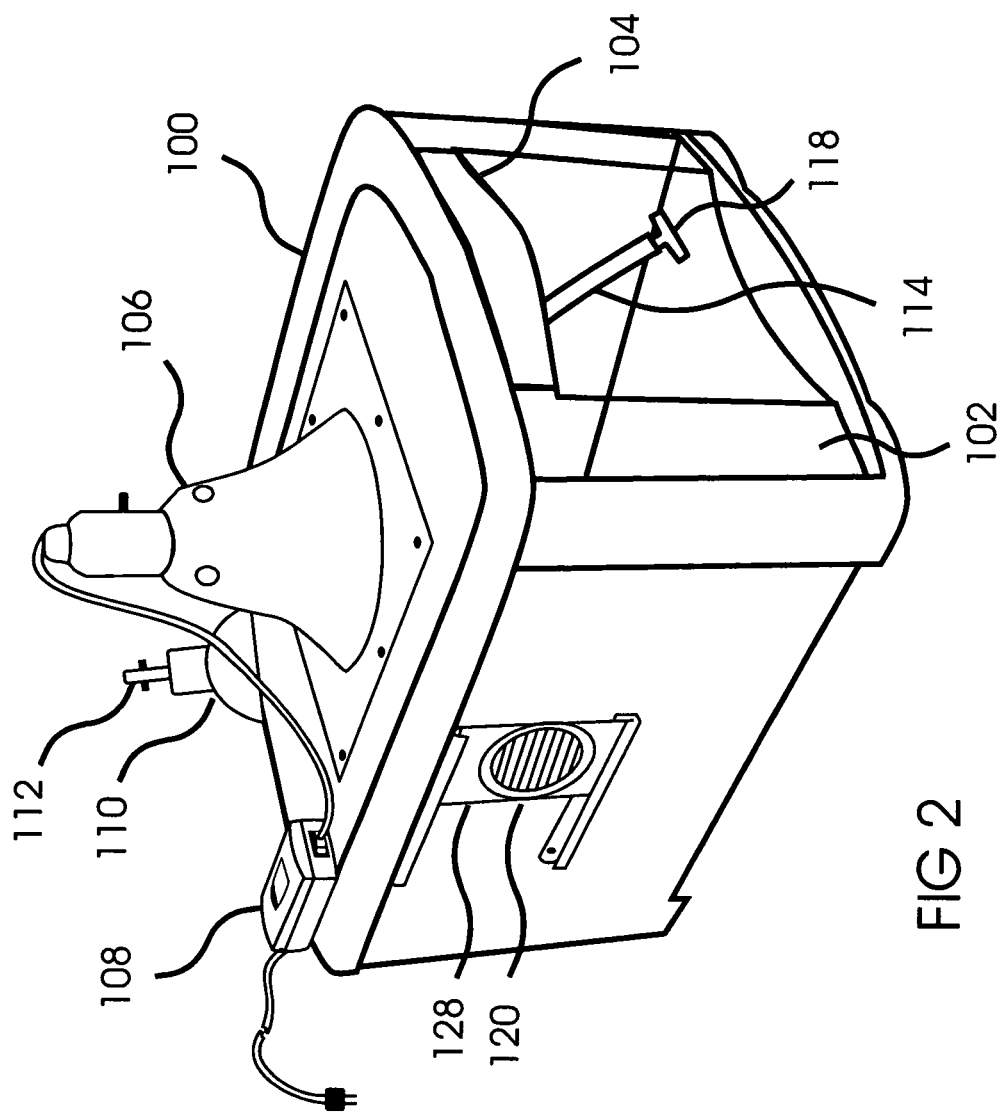
FIG. 2 is a perspective drawing that illustrates the preferred embodiment of FIG. 1 with the drawer inserted into the enclosure.

FIG. 2 illustrates the preferred embodiment of FIG. 1 with the drawer 102 inserted into the enclosure 100.

FIG. 3A illustrates the configuration of the drawer 102 of the preferred embodiment of FIG. 1 when the drawer 102 is inserted into the enclosure 100. In FIG. 3A, the enclosure 100 itself has been omitted from the drawing for visual clarity. It can be seen in FIG. 3A that the hose 114 is connected to a fitting 300 that is aligned with the hole (116 in FIG. 1), and enters the drawer 102 through the hole (116 in FIG. 1). When the hose 114 is removed from the fitting 300, air or oxygen, possibly including nebulized water, can be introduced through the fitting 300 and the hole (116 in FIG. 1) directly into the drawer 102.

A set of gages 302 is also shown in FIG. 3A, with one gage 304 indicating the temperature inside of the drawer 102 and the other gage 306 indicating the humidity inside of the drawer 102. The gages 302 are shown outside of the drawer 102 for visual clarity, with a dotted line in the drawing indicating their actual location in the bottom rear area of the drawer 102.

Figure 3B:
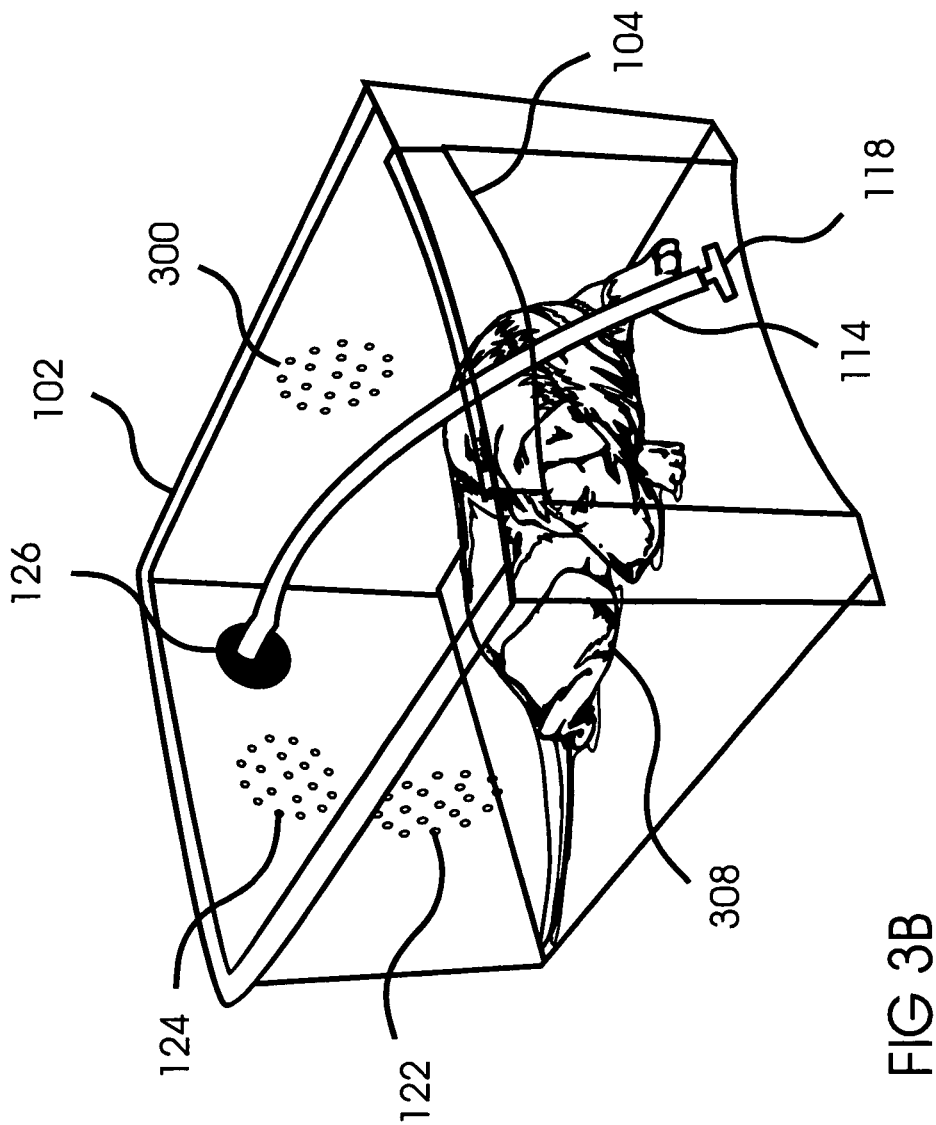
FIG. 3B is a perspective drawing of the drawer of FIG. 3A with a small animal contained in the drawer and with the drawer illustrated as being fully transparent.

FIG. 3B illustrates the drawer of FIG. 3A with a small dog 308 contained inside of the drawer 102. In FIG. 3B, for visual clarity, the gages 302 have been omitted and the drawer 102 has been represented as entirely transparent, including the handle, so that the dog 308 is more clearly visible.

Figure 4:
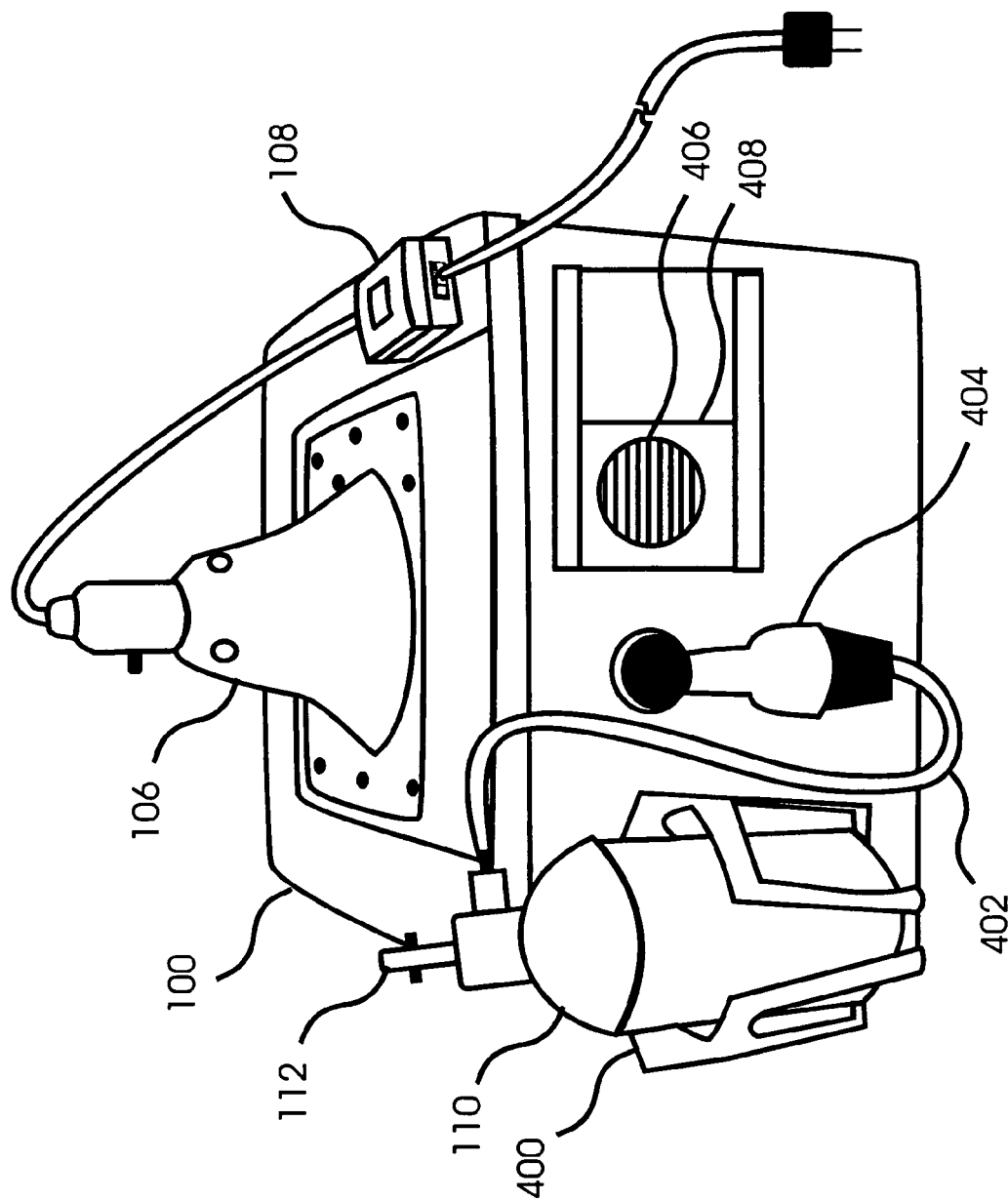
FIG. 4 is a perspective drawing from the rear of the preferred embodiment of FIG. 1 and FIG. 2.

FIG. 4 illustrates the enclosure 100 of the embodiment of FIG. 1 from the rear. In FIG. 4, it can be seen that the humidity bottle 110 is held by a humidity bottle holder 400 that is attached to the rear of the enclosure 100. Air or oxygen flows into the fitting 112 at the top of the humidity bottle 110, and moist air or moist oxygen flows out of the humidity bottle 110 through a hose 402 to a nebulizer 404, and from the nebulizer 404 into the interior of the drawer 102. When the air or oxygen is not being nebulized, a non-nebulizing fitting is used in place of the nebulizer 404 shown in the figure. Another vent 406 can be seen in the rear of the enclosure 100, in alignment with a vent (124 in FIG. 1) in a side of the drawer. In the figure the vent 406 is closed by a transparent cover 408.

Other modifications and implementations will occur to those skilled in the art without departing from the spirit and the scope of the invention as claimed. Accordingly, the above description is not intended to limit the invention except as indicated in the following claims.

What is claimed is:

1. An incubator for small animals, comprising:
   an enclosure having a first opening therein;
   a drawer having an open top and having dimensions, including depth, suitable for containing at least one small animal, the drawer and the first opening cooperatively configured so that the drawer can be slideably inserted into, and received by, the first opening of the enclosure until the drawer becomes sealably integrated with the enclosure, thereby closing the drawer and sealing off the first opening of the enclosure to create a controlled environment within the enclosure that is isolated from ambient conditions of the ambient environment outside of the enclosure; and
   a temperature-controlling apparatus coupled with the enclosure to control temperature of the controlled environment within the enclosure,
   whereby when an at least one small animal contained in the closed drawer is exposed to the controlled environment, it is inaccessible from outside of the enclosure while the drawer remains closed, and
   whereby access from outside of the enclosure to an at least one small animal, when contained in the closed drawer, can be restored by slideably withdrawing the drawer from the first opening of the enclosure to open the drawer and thereby expose the at least one animal to the conditions of the ambient environment outside of the enclosure.

2. The incubator of claim 1, wherein oxygen is supplied to the controlled environment through a second opening in the enclosure.

3. The incubator of claim 2, further comprising a hose inserted through the second opening of the enclosure for supplying the oxygen to the controlled environment, the hose further extending through a hole in a side of the drawer and into the drawer to bring the oxygen into close contact with an at least one small animal when contained in the drawer and to allow the drawer to be at least partially withdrawn from the enclosure, thereby providing access through the open top of the partially open drawer to an at least one small animal contained therein without requiring interruption of oxygen flow into the drawer.

4. The incubator of claim 3, wherein the hose is attachable to and removable from a fitting, the fitting being in alignment with the hole in the side of the drawer so as to allow at least one of air, oxygen, air nebulized with a medicinal fluid, and oxygen nebulized with a medicinal fluid to flow directly into the closed drawer and the controlled environment through the hole in the side of the drawer when the hose is removed from the fitting.

5. The incubator of claim 3, wherein the hose is terminated by an end piece that inhibits the hose from accidentally falling out of the hole when the drawer is at least partially withdrawn from the enclosure and that provides for oxygen to flow into the drawer and the controlled environment in at least two different directions, so as to provide enhanced distribution of oxygen inside of the drawer and the controlled environment.

6. The incubator of claim 1, further comprising means coupled to the enclosure for humidifying air contained within the controlled environment.

7. The incubator of claim 1, wherein the temperature-controlling apparatus includes a lamp used to supply heat to the controlled environment.

8. The incubator of claim 7, wherein the lamp includes an infrared bulb.

9. The incubator of claim 7, wherein the intensity of the lamp can be adjusted so as to control the temperature of the controlled environment.

10. The incubator of claim 1, wherein the temperature-controlling apparatus includes at least one of a temperature measuring device that can measure the temperature of the controlled environment, a humidity measuring device that can measure humidity of the controlled environment, and an oxygen saturation measuring device that can measure oxygen saturation of the controlled environment.

11. The incubator of claim 1, wherein at least one of temperature, oxygen saturation, and humidity of the controlled environment is measured by a sensor and is automatically controlled and maintained by a feedback regulator.

12. The incubator of claim 1, wherein the incubator is sufficiently light in weight and small in size to be conveniently moved from one location to another.

13. The incubator of claim 1, wherein the depth of the drawer provides containment of unsanitary contaminants introduced by the at least one small animal contained in the drawer, thereby inhibiting contamination of the controlled environment within the enclosure by limiting the unsanitary contaminants to the drawer.

14. The incubator of claim 1, whereby the incubator can be cleaned and disinfected mainly by slideably withdrawing the drawer from the enclosure, cleaning the drawer, disinfecting the drawer, and slideably reinserting the drawer into the enclosure through the first opening.

15. The incubator of claim 1, further comprising one or more vents located in an at least one enclosing wall of the enclosure, the one or more vents configured to maintain isolation between the controlled environment and the ambient conditions of the environment outside of the enclosure when closed, and further configured to be opened to permit air exchange between the controlled environment and the ambient environment surrounding the enclosure.

16. The incubator of claim 13, further comprising one or more vents located in at least one enclosing wall of the drawer, the location of the one or more vents in the enclosing wall of the drawer being aligned with at least some of the one or more vents located in the enclosing wall of the enclosure to facilitate the exchange of air between the controlled environment and the ambient environment surrounding the enclosure.

17. The incubator of claim 1, wherein said one or more vents comprise at least two vents in surrounding walls of the enclosure that are located such that when open, facilitate cross ventilation between the ambient environment surrounding the enclosure and the controlled internal environment.

18. The incubator of claim 1, further comprising a humidifier for humidifying the controlled environment, the humidifier comprising:
    a humidity bottle able to accept a flow of breathing gas that is one of air and oxygen and to supply moist breathing gas to the controlled environment; and
    a holder for holding the humidity bottle, the holder coupled to the enclosure.

19. The incubator of claim 1, wherein at least some part of at least one of the enclosure and the drawer is transparent, so as to allow observation from outside of the incubator of an at least one small animal contained in the drawer even when the drawer is closeably integrated with the enclosure.

\* \* \* \* \*